United States Patent
Wang et al.

(10) Patent No.: US 9,675,962 B2
(45) Date of Patent: Jun. 13, 2017

(54) PEROVSKITE-TYPE STRONTIUM TITANATE

(71) Applicant: AGENCY FOR SCIENCE, TECHNOLOGY AND RESEARCH, Singapore (SG)

(72) Inventors: Wei Wang, Singapore (SG); Liang Hong, Singapore (SG); Zetao Xia, Singapore (SG); Zhaolin Liu, Singapore (SG); Teng Sheng Peh, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 15/231,705

(22) Filed: Aug. 8, 2016

(65) Prior Publication Data

US 2016/0346767 A1    Dec. 1, 2016

Related U.S. Application Data

(62) Division of application No. 13/335,890, filed on Dec. 22, 2011, now Pat. No. 9,434,614.

(Continued)

(51) Int. Cl.
*B01J 23/83*     (2006.01)
*C01B 3/40*      (2006.01)
(Continued)

(52) U.S. Cl.
CPC ............. *B01J 23/83* (2013.01); *B01J 21/063* (2013.01); *B01J 23/002* (2013.01); *B01J 35/002* (2013.01); *B01J 37/03* (2013.01); *B01J 37/033* (2013.01); *B01J 37/08* (2013.01); *C01B 3/40* (2013.01); *B01J 2523/00* (2013.01);

(Continued)

(58) Field of Classification Search
CPC . B01J 23/83; B01J 23/002; B01J 37/08; B01J 2523/00; C01B 3/40; C01B 2203/0244; C01B 2203/1058; C01B 2203/1235
See application file for complete search history.

(56) References Cited

U.S. PATENT DOCUMENTS 5,986,301 A    11/1999  Fukushima et al.
6,238,816 B1   5/2001   Cable et al.
(Continued)

FOREIGN PATENT DOCUMENTS

FR       2 696 109 A1       4/1994
WO    WO 03/075383 A2     9/2003
WO    WO 2007/086949 A2   8/2007

OTHER PUBLICATIONS

Hui, Shiqiang, et al., "Electrical Conductivity of Yttrium-doped SrTiO$_3$: Influence of Transition Metal Additives", Materials Research Bulletin, vol. 37, pp. 1215-1231, (2002).

(Continued)

*Primary Examiner* — Matthew E Hoban
*Assistant Examiner* — James Fiorito
(74) *Attorney, Agent, or Firm* — Blakely, Sokoloff, Taylor & Zafman LLP

(57) ABSTRACT

The present invention relates to a perovskite-type strontium titanate, wherein the strontium titanate is Y- and Ni-doped and has the general formula (Sr,Y)(Ti,Ni)O$_3$. A method of preparing the perovskite-type strontium titanate and its use are also provided.

5 Claims, 7 Drawing Sheets

Related U.S. Application Data

(60) Provisional application No. 61/426,526, filed on Dec. 23, 2010.

(51) Int. Cl.
*B01J 37/03* (2006.01)
*B01J 37/08* (2006.01)
*B01J 21/06* (2006.01)
*B01J 23/00* (2006.01)
*B01J 35/00* (2006.01)
*C01G 23/00* (2006.01)

(52) U.S. Cl.
CPC ............. *C01B 2203/0244* (2013.01); *C01B 2203/1041* (2013.01); *C01B 2203/1058* (2013.01); *C01B 2203/1235* (2013.01); *C01B 2203/1247* (2013.01); *C01G 23/006* (2013.01); *Y02P 20/52* (2015.11)

(56) References Cited

U.S. PATENT DOCUMENTS

| | | |
|---|---|---|
| 6,488,739 B1 | 12/2002 | Mazanec et al. |
| 2002/0179887 A1 | 12/2002 | Zeng et al. |
| 2003/0129115 A1 | 7/2003 | Vaughey et al. |
| 2009/0169958 A1 | 7/2009 | Lin |
| 2009/0202408 A1 | 8/2009 | Talbot et al. |

OTHER PUBLICATIONS

Singapore Search Report for Singapore Application No. 201109591-6, 9 pp., (Nov. 6, 2013).
Restriction Requirement for U.S. Appl. No. 13/335,890, 9 pp., (Oct. 25, 2013).
Non-Final Office Action for U.S. Appl. No. 13/335,890, 8 pp., (Apr. 15, 2014).
Non-Final Office Action for U.S. Appl. No. 13/335,890, 10 pp., (Nov. 17, 2014).
Final Office Action for U.S. Appl. No. 13/335,890, 10 pp., (Jul. 14, 2015).
Notice of Allowance for U.S. Appl. No. 13/335,890, 9 pp., (May 4, 2016).

PEROVSKITE-TYPE STRONTIUM TITANATE

CROSS-REFERENCE TO RELATED APPLICATIONS

This application is a divisional of U.S. patent application Ser. No. 13/335,890, filed Dec. 22, 2011, entitled PEROVSKITE-TYPE STRONTIUM TITANATE, which claims the benefit of priority of U.S. Provisional Patent Application No. 61/426,526, filed Dec. 23, 2010, the contents of which were incorporated by reference in their entirety for all purposes.

TECHNICAL FIELD

The invention relates to perovskite-type strontium titanate, and in particular, to perovskite-type strontium titanate catalysts, their preparation methods and their uses.

BACKGROUND

Fuel cells have attracted considerable interest in the past two decades, mainly because of the increasing need to improve energy efficiency, as well as to address concerns on the environmental consequences of using fossil fuel for electricity generation and vehicle propulsion. Small fuel cell systems producing about 1 to about 100 kW power output are desirable for light-duty vehicles and auxiliary power supply units (APU) and have been recognized among the most successful applications of fuel cell technology so far.

However, the lack of an appropriate infrastructure for producing and distributing $H_2$ fuel is substantially hindering further developmental and commercialization activities of fuel cell technology. This has intensified research activities on fuel reforming, through which a fossil fuel is catalytically broken down to form a gas mixture of $H_2$, $CO_2$, $H_2O$ and CO. The fuel cell systems can then operate efficiently with the conventional liquid hydrocarbon fuels, such as ethanol, gasoline and diesel, and thus hydrogen storage and transportation problems could be avoided.

Among suitable liquid fuels that can be reformed, diesel is of particular interest, owing to its high energy density, well-established distribution infrastructure, relatively low price and ease of handling. In general, the conversion of diesel fuel to hydrogen-rich gas products can be carried out by three main reaction processes, namely steam reforming (SR), partial oxidation (POX) and autothermal reforming (ATR). Designating diesel fuel as $C_nH_m$, these three different catalytic reforming approaches can be described as follows:

SR: $C_nH_m + H_2O \rightarrow CO_x + H_2$  $\Delta H_f > 0$ 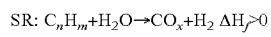

POX: $C_nH_m + O_2 \rightarrow CO_2 + H_2 (+H_2O)$  $\Delta H_f < 0$ 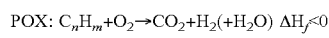

ATR: $C_nH_m + H_2O + O_2 \rightarrow CO_x + H_2$  $\Delta H_f \sim 0$ 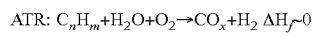

where n=~10 to 20 and x=1 or 2.

ATR, being considered as a combination of the endothermic SR reaction and the highly exothermic POX reaction, allows the control of the total heat balance by adjusting the feed proportions of diesel fuel, air and steam, and is much less externally energy-intensive and thus cost-effective. In addition, the ATR process offers simpler reactor design, lower operation temperature and more dynamic response to work under varying load. It is also postulated that the water-gas-shift (WGS) reaction shown below plays a significant role in the diesel AIR process, which may help further increase the hydrogen yield in the final ATR products:

WGS: $CO + H_2O \leftrightarrow CO_2 + H_2$ 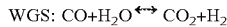

Nevertheless, the diesel ATR is still a great challenge nowadays, especially on the ATR catalyst development. For example, the presence of heavy polyaromatics in the diesel poses a threat of carbon formation (i.e. coking) on the catalytically active sites and thus deactivates the catalyst itself. This is particularly the case for most Ni-based catalysts and even some noble-metal catalysts. Moreover, the kinetics of polyaromatics reforming reaction is much slower than that of other components in the diesel fuel such as paraffins, which usually requires higher operation temperature and may in turn cause excessive sintering of metal catalysts.

Another major challenge is from the inherently existing sulfur species, which can readily react with transition metals and form stable metal sulfide, resulting in the deactivation of the catalyst systems. Some noble-metals (e.g. Ru, Rh, Pt) were reported to pose excellent catalytic activity towards diesel reforming, while critical issues like sulfur poisoning and long-term operation stability have yet been addressed. 1% Pt/ceria catalyst has been shown to exhibit good stability for the ATR of synthetic diesel fuel (sulfur-free) but was severely poisoned in the sulfur containing fuel. It was also reported that, up to 10% Ni in the Rh—Ni/CeO$_2$—Al$_2$O$_3$ catalyst system could act as a protective and sacrificial metal for Rh, and contribute to a much higher sulfur tolerance, i.e. more than 95% conversion in sulfur-containing fuel (22 ppm S) for 72 hrs. Such performance is not satisfactory to drive fuel cell systems. The high cost of noble metals is another great commercial obstacle for their widespread use.

The beneficial effect of oxygen-ion conductivity for the catalytic reforming of hydrocarbons has recently been reported. It was found that, noble metals such as Pt or Rh were more active when supported on ceria compared to when supported on alumina. The inherent oxygen-ion conductivity in ceria may contribute to the water dissociation on the ceria surface and subsequently oxygen transfer to the supported metals, which may result in carbon gasification at elevated temperatures, and then help to maintain a carbon-free catalyst surface.

Perovskite oxides with a typical formula $ABO_3$ have been known and reported for their mixed oxygen-ion and electronic conductivity. However, the use of such perovskite oxides has been mainly focused on solid oxide fuel cell applications or ceramic membrane applications.

Thus, there remains a need to provide for a catalyst system that overcomes, or at least alleviates, the above-mentioned coking and/or sulfur-poisoning problems.

SUMMARY

The present invention relates to perovskite-type strontium titanate catalysts that demonstrate improved reforming performance as well as increased coking and sulfur resistances during reforming of sulfur-containing fuels.

In a first aspect of the invention, there is provided a perovskite-type strontium titanate, wherein the strontium titanate is Y- and Ni-doped and has the general formula $(Sr,Y)(Ti,Ni)O_3$.

In a second aspect of the invention, a catalyst comprising the present perovskite-type strontium titanate is provided.

In a third aspect of the invention, use of the present perovskite-type catalyst for autothermal reforming of a fuel is disclosed.

A fourth aspect of the invention relates to a method for autothermal reforming of a fuel, comprising contacting the present perovskite-type catalyst with the fuel.

A further aspect of the invention relates to a method for preparing a perovskite-type strontium titanate. The method includes:
- providing a solution comprising strontium nitrate, yttrium nitrate hexahydrate, and nickel (II) nitrate hexahydrate;
- adding titanium bis(ammonium lactate) dihydroxide and at least two complexing agents to the solution;
- heating the solution to form precursors of the perovskite-type strontium titanate; and
- calcining the precursors to obtain the perovskite-type strontium titanate.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DETAILED DESCRIPTION

Figure 1:
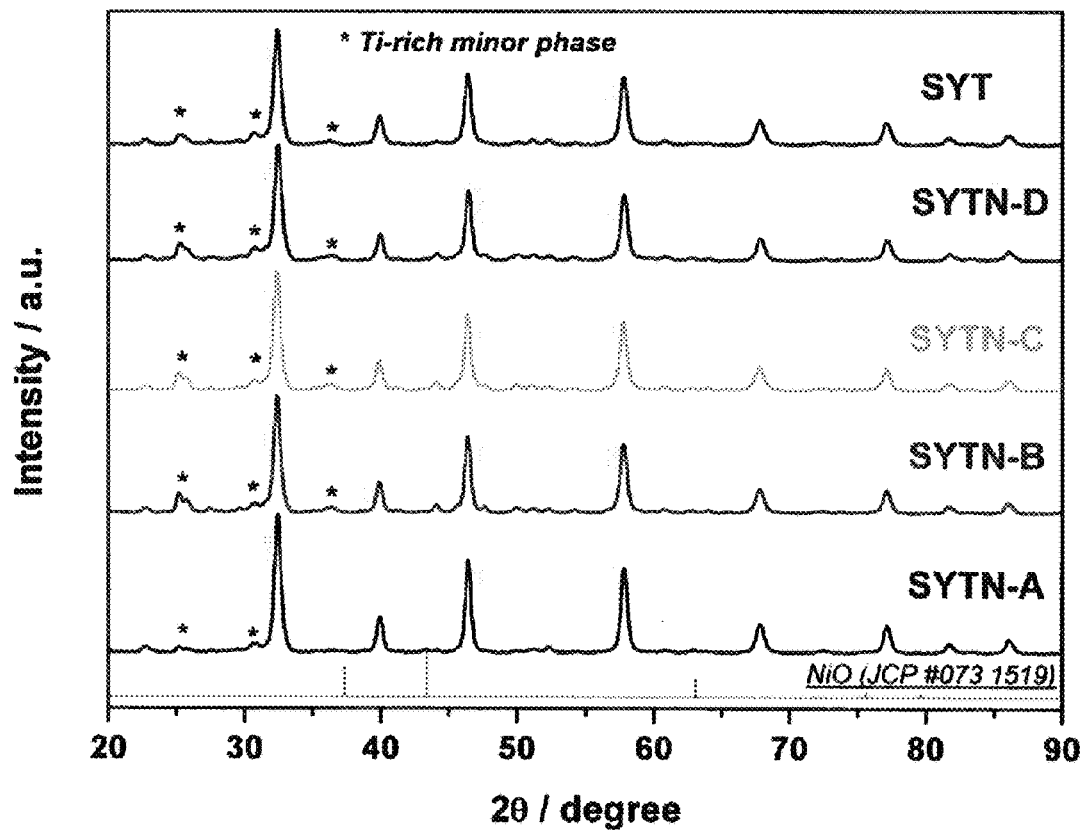
FIG. 1 shows the powder X-ray diffraction (XRD) pattern for (Sr,Y)(Ti,Ni)O$_3$ catalysts (SYTN) and (Sr,Y)TiO$_3$ catalyst (SYT).

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

In a first aspect, a perovskite-type strontium titanate is provided. The strontium titanate is Y- and Ni-doped and has the general formula (Sr,Y)(Ti,Ni)O$_3$.

In the present context, a "perovskite-type" strontium titanate is meant the strontium titanate has a perovskite oxide-related ABO$_3$ structure. The cations A and B are of very different sizes with A much larger than B, and the anions O$^{2-}$ are bound to both cations. In present embodiments, the perovskite-type strontium titanate has a general SrTiO$_3$ structure, i.e. A is Sr and B is Ti.

The crystal structure of perovskite-type materials can tolerate extensive modifications with regard to its composition and can still or even as a result exhibit promising physical and chemical properties. In particular, the material can be doped, i.e. the A- and/or B-site cations can be partially replaced, in attempt to alter, preferably improve, the physical and chemical properties such as catalytic activity, thermal and chemical stability, and tolerance to coking and sulfur-poisoning, which can play an important role for diverse applications.

Dopants, alternatively also known as doping ions, doping agents and the like, partly replace the A- and/or B-site cations in the crystal structure. Suitable dopants for the A-site cation include those having similar cationic size and charge as the host cation A. Similarly, suitable dopants for the B-site cation include those having similar cationic size and charge as the host cation B. The dopants are generally metal ions, for example transition metal ions.

It has been found by the present inventors that low-level substitution of Sr by Y in the strontium titanate perovskite dramatically promotes the catalytic activity of the strontium titanate perovskite. This can be even further increased by doping the Y-doped strontium titanate with low levels of Ni, with the Ni replacing the Ti. The resulting materials have excellent catalytic activity and are particularly suitable for use in sulfur-containing fuel autothermal reforming (ATR).

This approach avoids the use of precious metal additives for the ATR of hydrocarbon fuels, thereby realising a low-cost ceramic catalytic system. The Y- and Ni-doped strontium titanate may be represented by the general formula (Sr,Y)(Ti,Ni)O$_3$.

The stoichiometries of the A- and B-site substituted strontium titanate perovskite may be varied in order to optimise the physical and/or chemical properties of the catalyst. In particular, the stoichiometries of the A- and B-site cations, including the respective dopants, are adjusted to tailor to the use of the catalyst in autothermal reforming of fuels where high catalytic activity, high resistances to coking and sulfur-poisoning, as well as high thermal stability at elevated temperatures are highly desired.

In various embodiments, the perovskite-type strontium titanate has the following formula (I):

$$(Sr_aY_b)_d(Ti_{1-c}Ni_c)O_3 \qquad (I)$$

where a, b, c, and d represent the respective ratio of material present in strontium titanate.

In various embodiments, 0.8≤a≤1. For example, a can be 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or 1.0.

In various embodiments, 0<b≤0.2. For example, b can be 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, or 0.20.

In various embodiments, 0<c≤0.1. For example, c can be 0.01, 0.02, 0.03, 0.04, 0.05, 0.06, 0.07, 0.08, 0.09, or 0.10.

In various embodiments, 0.8≤d≤1.2. For example, d can be 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.05, 1.10, 1.15, or 1.2.

The stoichiometries of the A- and B-site substituted strontium titanate perovskite may be varied. For example, with reference to the B-site composition and setting the value of d in formula (I) to 1, by varying the value of a and/or b in formula (I), an over-stoichiometric composition at the A-site, a stoichiometric composition at the A-site, or an under-stoichiometric composition at the A-site may be obtained.

By a "stoichiometric composition at the A-site" is meant that a b=1 such that the stoichiometric ratio of A-site to B-site is 1.

In one embodiment for a stoichiometric composition at the A-site, the strontium titanate has the formula $(Sr_{0.92}Y_{0.08})(Ti_{0.94}Ni_{0.06})O_3$.

By an "under-stoichiometric composition at the A-site" is meant that a+b<1 such that the stoichiometric ratio of A-site to B-site is <1. Alternatively, the strontium titanate can be said as A-site deficient.

In one embodiment for an under-stoichiometric composition at the A-site, the strontium titanate has the formula $(Sr_{0.88}Y_{0.08})(Ti_{0.94}Ni_{0.06})O_3$.

By an "over-stoichiometric composition at the A-site" is meant that a+b>1 such that the stoichiometric ratio of A-site to B-site is >1. Alternatively, the strontium titanate can be said as A-site excess.

In one embodiment for an over-stoichiometric composition at the A-site, the strontium titanate has the formula $(Sr_{0.97}Y_{0.10})(Ti_{0.94}Ni_{0.06})O_3$.

In an alternative embodiment for an over-stoichiometric composition at the A-site, the strontium titanate has the formula $(Sr_{0.97}Y_{0.10})(Ti_{0.92}Ni_{0.08})O_3$.

It has been surprisingly found by the present inventors that an over-stoichiometric composition of the A-site is even more efficient in terms of catalytic activity than the other two types.

The present perovskite-type strontium titanate may be prepared by the following method. A solution comprising strontium nitrate $(Sr(NO_3)_2)$, yttrium nitrate hexahydrate $(Y(NO_3)_3.6H_2O)$, and nickel (II) nitrate hexahydrate $(Ni(NO_3)_2.6H_2O)$ is first provided.

The (nitrate) solution may be prepared by dissolving the respective nitrate salts in distilled water or de-ionised water. The nitrate salts dissolve readily in water. The manner or the sequence of dissolving the respective nitrate salts has no particular influence on the material structure, composition, or catalytic performance. For example, the respective nitrate salts may be individually dissolved in separate containers. Alternatively, the respective nitrate salts may be simultaneously dissolved in the same container. The respective nitrate salts may also be sequentially dissolved in the same container. Yet alternatively, two of the nitrate salts may be simultaneously or sequentially dissolved in the same container while the third nitrate salt is dissolved in a separate container.

Titanium bis(ammonium lactate) dihydroxide and at least two complexing agents are then added to the nitrate solution. The manner or the sequence of adding titanium bis(ammonium lactate) dihydroxide and the complexing agents has no particular influence on the material composition or catalytic performance. For example, titanium bis(ammonium lactate) dihydroxide and the complexing agents may be added simultaneously to the nitrate solution. Alternatively, titanium bis(ammonium lactate) dihydroxide and the complexing agents may be added sequentially to the nitrate solution. For example, titanium bis(ammonium lactate) dihydroxide may be added first, followed by adding simultaneously the complexing agents to the nitrate solution. In the present invention where a water-based process has been developed, it has been found by the present inventors that titanium bis(ammonium lactate) dihydroxide is water soluble, is relatively stable in the weakly acidic nitrate solution, and thus is particularly useful in the synthesis of the perovskite-type strontium titanate. Other types of titanium precursors or compounds, and thus organic-based processes may also be useful. For example, if the titanium compounds are sensitive to moisture, titanium dioxide precipitates may form in water. In such circumstances, an organic solvent can be used to prevent titanium dioxide precipitate from forming. In more extreme circumstances, the synthesis may be carried out in a nitrogen glove box.

The complexing agents, or otherwise also known as chelating agents, may be water soluble, inert to air and can be used to prepare chelating complexes with the A- and B-cations in the aqueous solution. In various embodiments, the complexing agents are selected from the group consisting of citric acid (CA), ethylene glycol (EG), and ethylenediaminetetraacetic acid (EDTA).

In one embodiment, the two complexing agents are CA and EG.

In an alternative embodiment, the two complexing agents are EDTA and EG.

In yet another embodiment, three complexing agents are used. The three complexing agents may be CA, EG and EDTA.

The solution containing the nitrates and the complexing agents is heated to form precursors of the catalyst. The solution may also be stirred simultaneously and continuously during the heating until the chelating reaction is complete. In various embodiments, the solution may be heated on a hotplate under magnetic stirring at about 80 to about 100° C. until precursors of the perovskite-type strontium titanate are formed.

In one embodiment, complexing agents CA and EG are added to the nitrate solution under continuous stirring and heating.

In another embodiment, complexing agents CA and EG are added to the solution. The solution is then subject to simultaneous heating and stirring.

In one embodiment, a clear light green coloured solution containing the nitrates and the complexing agents is obtained when CA is fully dissolved under continuous heating and stirring. The solution is then heated on a hotplate under magnetic stirring at about 80° C. to about 100° C. A chelating polymer gel is usually obtained after completely removing the water. The thus-formed gel is then subjected to further heating at about 150° C. in an oven to obtain the precursors. The precursors exist as a macromolecular network throughout which all the constituent elements are uniformly distributed at the atomic level. The subsequent high-temperature calcination leads to the formation of perovskite structure with desired chemical composition.

In various embodiments, the precursors are calcined to a temperature of between about 700 and 1,000° C. For example, the calcination temperature may be about 700, 800, 820, 850, 880, 900, 920, 950, 980, or 1,000° C.

In various embodiments, the precursors are calcined for more than 1 hour in air. For example, the precursors are calcined for about 1 hour, about 2, 3, 4, 5, 6, or 7 hours in air.

The thus-obtained perovskite-type strontium titanate powder may be further processed or treated in accordance with the intended use. Due to the perovskite structure, the present strontium titanate possesses good oxygen-ion conductivity and chemically robust structure at elevated temperatures, even at fuel reforming temperatures. Additionally, strontium titanate perovskite structure exhibit good structural stability in redox environment, strong carbon deposition resistance and sulfur tolerance towards sulfur-containing hydrocarbon fuels. The inherent oxygen-ion conductivity was believed to significantly increase the coking resistance towards heavy hydrocarbons. Hence, in various embodiments, the perovskite-type strontium titanate is used as a catalyst in the autothermal reforming of a fuel. The calcined catalyst powder may be pelletized in a hydraulic press, crushed and sieved into catalyst particles in the size of about 0.2 to about 0.4 mm for use in the autothermal reforming.

During the autothermal reforming of the fuel, the perovskite-type catalyst is contacted with fuel. In various embodiments, the fuel is a diesel fuel. The fuel may comprise less than about 30 mol % aromatic compounds. Alternatively or additionally, the fuel may comprise less than about 50 ppm sulfur-containing compounds.

In order that the invention may be readily understood and put into practical effect, particular embodiments will now be described by way of the following non-limiting examples.

EXAMPLES

Example 1: Catalyst Preparation and Characterization

Yttrium- and nickel-doped $SrTiO_3$ ceramics powders with varying ABB ratio and Ni-substitution level were synthesized via the Pechini method. $Sr(NO_3)_2$, $Y(NO_3)_3 \cdot 6H_2O$, $[CH_3CH(O{-})CO_2NH_4]_2Ti(OH)_2$ (titanium bis-ammonium lactate dihydroxide), $Ni(NO_3)_2 \cdot 6H_2O$, all in reagent grades purchased from Sigma-Aldrich, Singapore, were used as the raw materials for the metal ion sources; citric acid (CA) and ethylene glycol (EG) served as complexing agents. Appropriate amount of metal salts according to the nominal chemical composition as shown in Table 1 were dissolved in distilled water.

TABLE 1

Chemical composition of (Sr, Y)(Ti, Ni)$O_3$ catalysts

| Catalyst | Formula | Remarks |
|---|---|---|
| SYTN-A | $(Sr_{0.88}Y_{0.08})$ $(Ti_{0.94}Ni_{0.06})O_3$ | A-site deficient |
| SYTN-B | $(Sr_{0.92}Y_{0.08})$ $(Ti_{0.94}Ni_{0.06})O_3$ | Stoichiometric |
| SYTN-C | $(Sr_{0.97}Y_{0.10})$ $(Ti_{0.94}Ni_{0.06})O_3$ | A-site excess |
| SYTN-D | $(Sr_{0.97}Y_{0.10})$ $(Ti_{0.92}Ni_{0.08})O_3$ | A-site excess |
| SYT | $(Sr_{0.97}Y_{0.10})TiO_3$ | No Ni substitution |

CA and EG were then added in at a molar ratio of Ti:CA:EG=1:4:9.33, under continuous stirring and heating. After CA was fully dissolved, a clear solution with light green color was formed. The mixed solution was subsequently heated at 80 to 100° C. on the hotplate under magnetic stirring, until a gel (i.e. the catalyst precursor) was formed. The gel was then dried at 150° C. overnight, and calcined at 900° C. for 4 hours in air, to obtain the desired perovskite powders. The calcined powders were pelletized in a hydraulic press, crushed, and sieved into catalyst particles in the size of 0.2 to 0.4 mm for catalytic performance evaluation.

The phase structures of the as-synthesized and post-tested perovskite catalysts were analyzed with an X-ray diffractometer (Philips MPD 1880) using monochromatic Cu Kα radiation generated at 40 kV and 40 mA. The microstructure of the catalyst particles was examined by field emission scanning electron microscopy (JEOL, FESEM JSM6700F).

FIG. 1 illustrates the XRD patterns of $(Sr,Y)(Ti,Ni)O_3$ ceramics calcined in air at 900° C. for 4 hrs. It was found that, in addition to the cubic perovskite phase, some minor phases were also detected for all the compositions studied, which could probably be related to a segregated $TiO_2$ Brookite orthorhombic phase or an $Y_2Ti_2O_7$ cubic phase.

On the other hand, low-level Ni substitution of Ti at the B-site of perovskite structure up to 8 mol % did not introduce any secondary phases. However, further increasing of Ni content to 10 mol %, resulted in strong reflection peaks from various secondary phases. The reason for the presence of Ti-rich minor phase even in the A-site excess compositions, i.e. SYTN-C and SYTN-D, is still unknown. However, considering the complexity of $(Sr,Y)(Ti,Ni)O_3$ perovskite composition, it may likely be due to the different affinity of metal anions with organic ligands in the sol-gel process, which could in turn lead to slight deviation on the chemical composition and hence phase segregation in the subsequent calcination process. The overlapping with the perovskite peaks has made it difficult to exactly determine the minor oxide phase correctly with XRD. Nevertheless, as will be discussed later, this Ti-rich phase seemed inert to the catalytic diesel ATR reactions, and remained unchanged in the post-tested catalysts.

Figure 2:
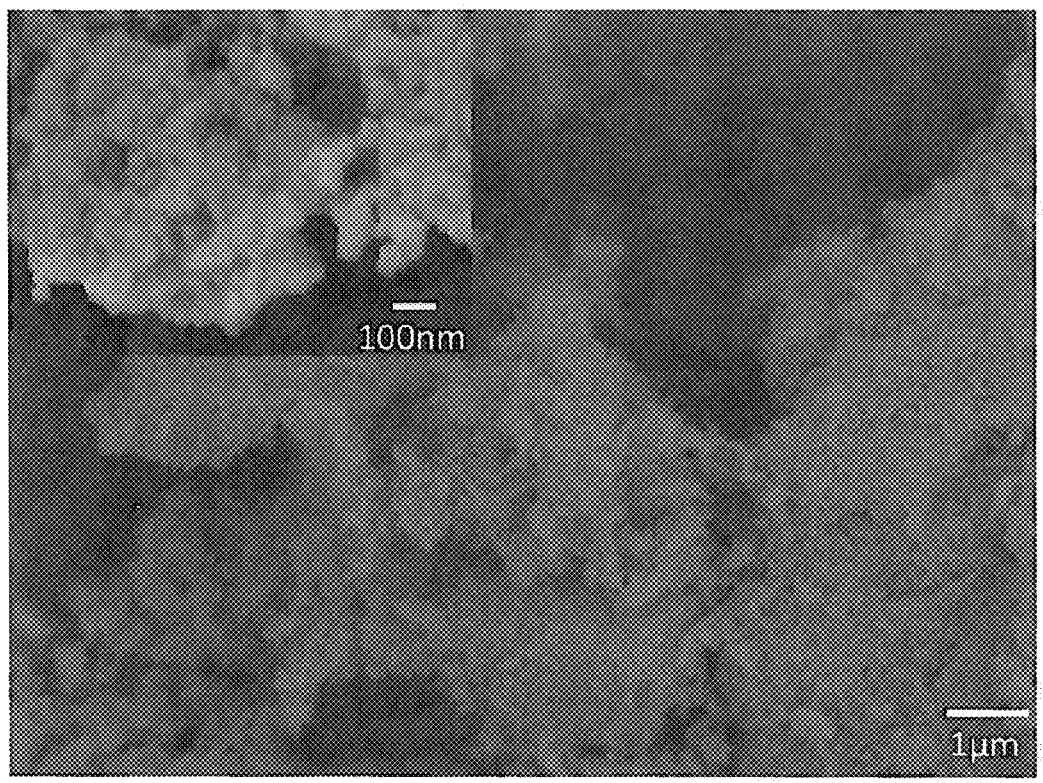
FIG. 2 depicts the scanning electron micrograph (SEM) of as-prepared SYTN-C catalyst.

The SEM picture in FIG. 2 illustrates a representative surface morphology of the freshly-prepared SYTN catalysts, which have been pelletized, crushed and sieved to 0.2 to 0.4 mm. A highly porous surface consisting of many loosely contacted perovskite particles was observed. The as-synthesized perovskite particles were very small in size, i.e. 20 to 40 nm, owing to the relatively low calcination temperature employed.

Example 2: Fixed Bed ATR Test

Testing of the catalysts in ATR reactions was performed in a plug-flow microreactor system, in which a ¼" stainless steel reactor tube was housed inside an electric furnace. Approximately 0.2 to 0.5 g catalyst with particle size of 0.2 to 0.4 mm was placed in the center of the reactor tube. Two thermocouples were placed at the top and bottom of the catalyst bed, to accurately control the reaction temperature.

The $H_2O/C$ and $O_2/C$ feed ratios of the ATR experiments were 3 mol/mol and 0.35 mol/mol, respectively. These ratios were selected on the basis of thermodynamic calculations to provide a thermoneutral ATR of surrogate diesel fuel and to minimize coking in the reactor tube. The conversion rate is defined as, $$\text{Conversion (\%)} = \frac{\text{total mole amount of C component in dry product gas}}{\text{total mole amount of C in feed } C_n H_m}$$

The product selectivity $S_i$ was calculated with the equation as follows, $$S_i = \frac{n_i}{\sum n_i}$$

where $n_i$ is the molar amount of product i on the basis of the measured dry product gas.

Figure 3:
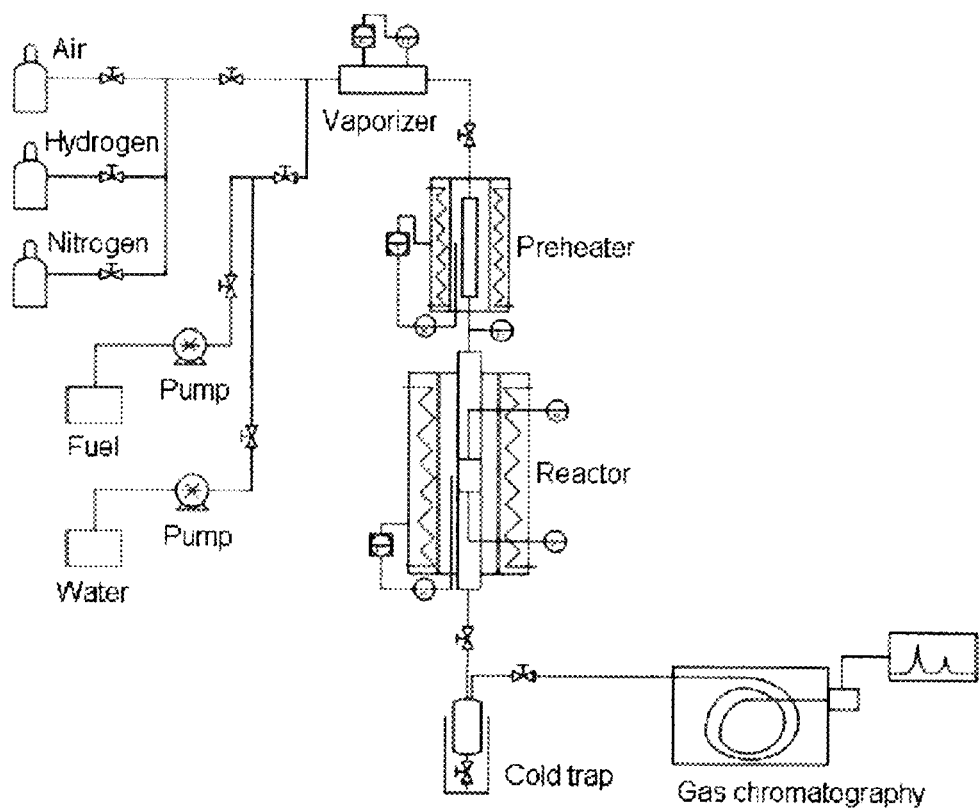
FIG. 3 depicts the schematic of diesel autothermal reforming reactor and gas chromatograph.

The reforming performance of SYTN catalysts was evaluated under ATR condition (i.e. $O_2/C=0.35$, $H_2O/C=3$) with surrogate diesel feed consisting of 70 mol % dodecane, 30 mol % tetralin. For the sulfur tolerance study, 50 ppm organic sulfur compound in the form of 3-methyl-benzothiophene (MBTP) was added into the fuel blend. Liquid feed of water and surrogate diesel fuel was vaporized and mixed along with air at a vaporizer unit heated at 180° C. The stream was then passed through a preheater containing silicon carbide bed at 400° C. to enhance mixing and temperature uniformity, prior to being introduced into the reactor tube set at 750° C. Calibrated mass flow controllers and HPLC pumps were used to regulate the flow rates of the gaseous and liquid reactants, respectively. The reformate leaving the reactor was cooled down in a cold trap set at 4° C. to remove unreacted fuel, steam and heavy residual hydrocarbons with boiling points greater than ~4° C. The dry product gas was then analyzed every 40 minutes using an online gas chromatography (Shimadzu, GC-2010) equipped with a thermal conductivity detector (TCD) and a flamed ionization detector (FID). FIG. 3 illustrates a simplified schematic of the micro-reactor and GC system. The test temperature and gas hourly space velocity, if not otherwise specified, were 750° C. and 5,000 $hr^{-1}$, respectively.

Example 3: Catalyst Performance Evaluation

Figure 4:
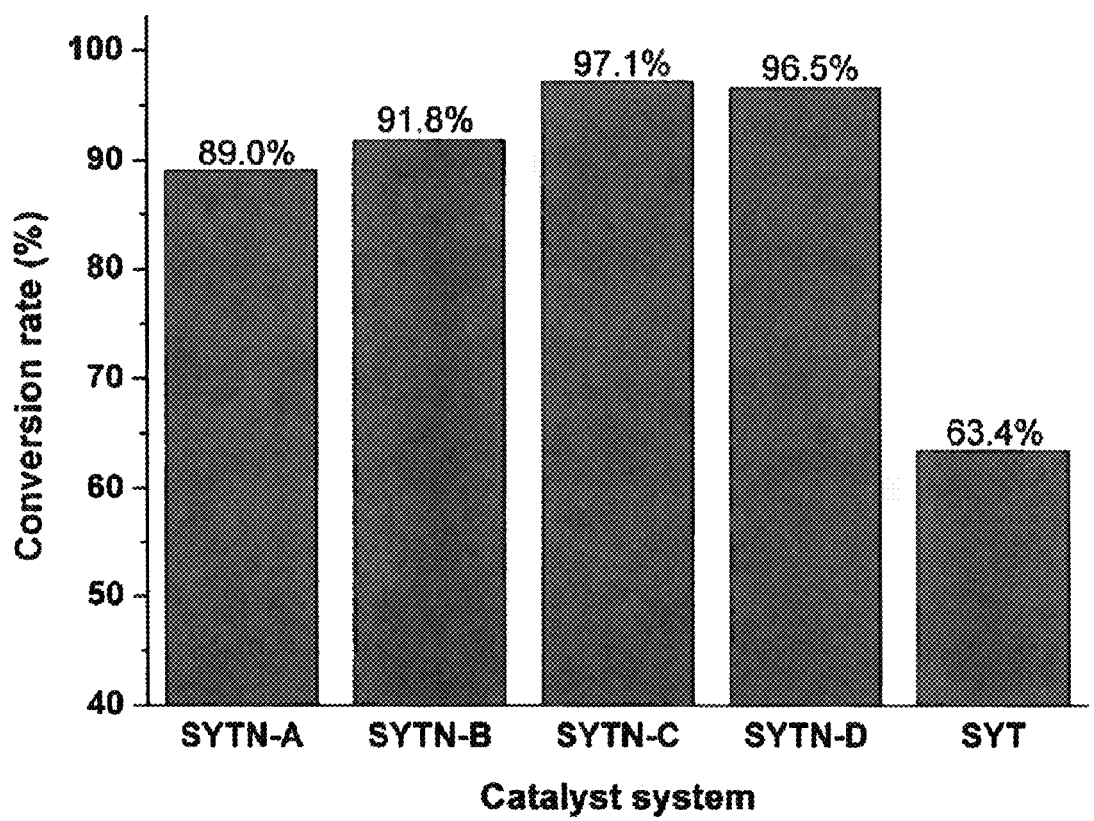
FIG. 4 depicts the conversion rate of various catalyst systems with surrogate diesel feed at 750° C.

Five catalysts, namely SYTN-A, SYTN-B, SYTN-C, SYTN-D, and SYT, were made and tested in surrogated diesel feed at 750° C. The catalyst composition and ATR test conditions are listed in Example 1 and Example 2, respectively. Shown in FIG. 4 is the comparison of the conversion of surrogate diesel feed over the perovskite catalysts with varying A/B stoichiometry and Ni doping level. The main products of the surrogate diesel ATR reaction were hydrogen, carbon dioxide, carbon monoxide and methane, as summarized in Table 2.

TABLE 2

Conversion and Product Selectivity of Surrogate Diesel ATR

| Catalyst | SYTN-A | SYTN-B | SYTN-C | SYTN-D | SYT |
|---|---|---|---|---|---|
| Fuel | 70 mol % Dodecane, 30 mol % Tetralin, 50 ppm MBTP | | | | |
| Conversion (%) | 89.0 | 91.8 | 97.1 | 96.5 | 63.4 |
| Product selectivity | | | | | |
| $H_2$ (mol %) | 60.4 | 60.8 | 61.3 | 61.8 | 50.0 |
| $CO_2$ (mol %) | 22.5 | 24.6 | 24.1 | 23.6 | 32.6 |
| CO (mol %) | 13.5 | 11.5 | 11.3 | 11.3 | 8.3 |
| $CH_4$ (mol %) | 3.7 | 3.1 | 3.3 | 3.3 | 9.1 |

*MBTP: 3-methyl-benzothiophene

It can be seen that, yttrium-doped strontium titanate perovskite with no Ni substitution (SYT) has poor catalytic activity for diesel ATR. The conversion was only 63.4%. This value is in agreement with thermal cracking experiments of individual hydrocarbons (n-dodecane, toluene, etc) under ATR conditions. It was reported that the conversions of n-dodecane and toluene under ATR condition at 700° C. were at 71.4% and 53.4%, respectively. The rather high $CO_2$ content for the reaction with SYT catalyst implies that the conversion of surrogate diesel may likely proceed through oxidation reactions (POX), whereas thermal cracking of aliphatic and aromatic hydrocarbons may contribute to the formation of light hydrocarbons and hydrogen. Indeed, severe coking was observed on the SYT catalyst after an ATR test for ~40 hrs.

On the other hand, substitution of Ti by Ni considerably promotes the conversion of surrogate diesel under ATR condition. All the SYTN catalysts achieved around 90% conversion or even higher, with little or no carbon formation during reforming at 750° C. for ~40 to 60 hours. The $H_2$ selectivity was constantly above 60% on the dry basis. It is also found that for the same Ni doping level (i.e. 6 mol % Ni), SYTN-C catalyst with an A-site excess stoichiometry exhibits much higher catalytic activity as compared to the other two catalysts with stoichiometric (SYTN-B) or A-site deficient (SYTN-A) compositions. The conversion of surrogate diesel over SYTN-C catalyst at 750° C. was 97.1%. With fixed A/B stoichiometry, further increasing on Ni doping did not cause any significant change on the catalytic performance. A comparable conversion of 96.5% was observed on SYTN-D catalyst which has 8 mol % Ni at the B-site. It should be noted that such high conversions on SYTN-C and SYTN-D catalysts, both of which had A-site excess compositions, were achieved with the presence of 30 mol % aromatic hydrocarbon and 50 ppm organic sulfur compound in the surrogate diesel feed.

Example 4: Durability Test

Figure 5:
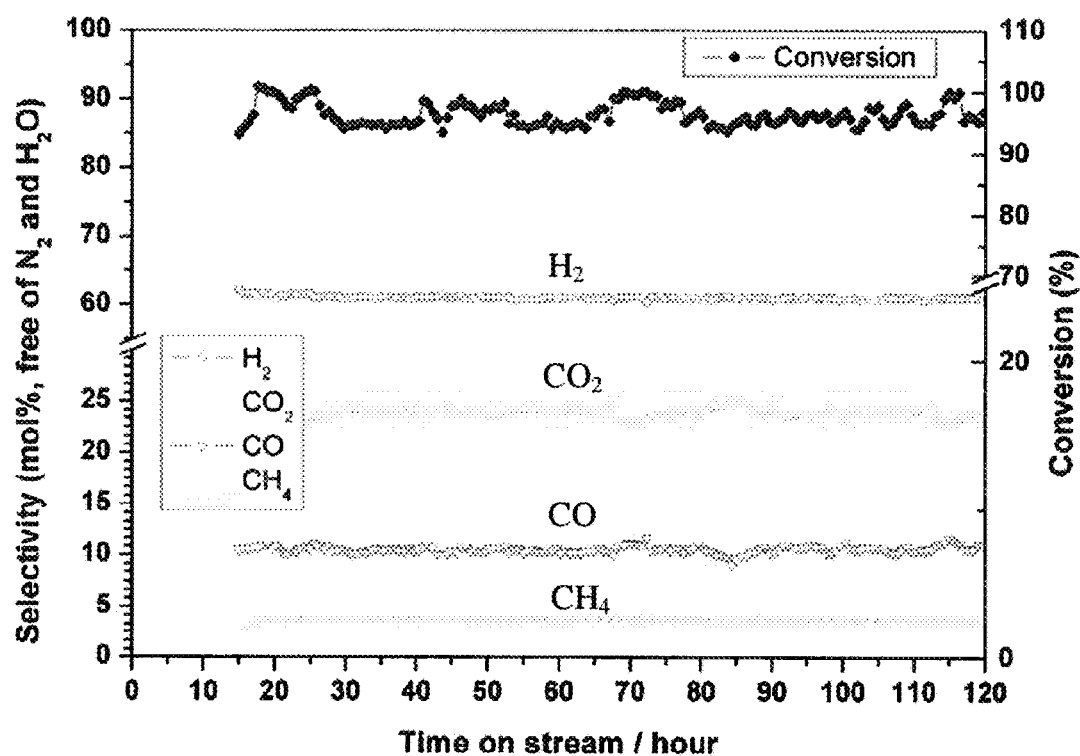
FIG. 5 depicts the time-dependent performance profiles of SYTN-C catalyst in the ATR of surrogate diesel consisting of 70 mol % dodecane, 30 mol % tetralin and 50 ppm 3-methyl-benzothiophene (MBTP) at the reaction conditions of O$_2$/C=0.35, H$_2$O/C=3, GHSV=5,000 hr$^{-1}$ and 750° C.

A SYTN-C catalyst, i.e. $(Sr_{0.97}Y_{0.10})(Ti_{0.94}Ni_{0.06})O_3$, was made and tested according to the same steps in Example 1 and Example 2 respectively. A durability test was conducted at 750° C. and 5,000 $hr^{-1}$ GHSV in surrogate diesel feed under ATR condition for 120 hours. FIG. 5 shows the variations in the conversion and product selectivity as function of time-on-stream for the test over a SYTN-C catalyst. The conversion was sustained >95% with no appreciable performance degradation. Additionally, the catalyst maintained its activity and selectivity for the entire 120 hours test.

Figure 6:
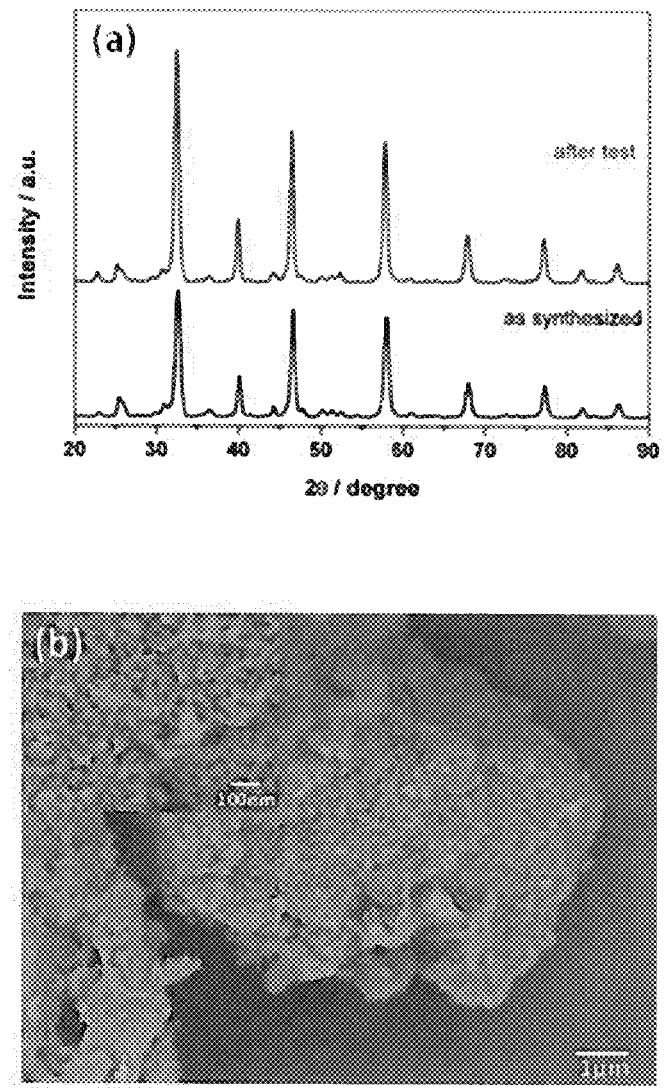
FIG. 6 depicts the X-ray diffraction pattern (a) and scanning electron microscopy (b) of the spent SYTN-C catalyst after durability test for 120 hours in surrogate diesel.

The XRD and microstructure examination on the spent SYTN-C catalyst after durability test further confirmed its chemically robust structure in diesel ATR condition. As shown in FIG. 6(*a*), the XRD pattern on the spent SYTN-C catalyst is essentially identical with that of freshly-prepared sample, i.e. main cubic perovskite phase and Ti-rich minor phase. FIG. 6(*b*) illustrates the surface morphology of the spent SYTN-C catalyst after durability test. The catalyst surface was free of any carbon deposition. Well-defined ceramics particles of ~20 to 40 nm were observed. No particles growth or agglomeration after 120 hours test was found, indicating a good thermal stability of the catalyst. This observation is different from most of the conventional Ni-based catalysts which usually undergo severe thermal sintering and subsequently catalyst degradation. The superior thermal stability of the SYTN catalyst in this invention can be attributed to the full ceramic structure of SYTN, as well as the apparent difference between the test temperature (i.e. 750° C.) and the catalyst preparation temperature (i.e. 900° C.).

Example 5: Coking and Sulfur Tolerance Study of SYTN Catalysts

A SYTN-D catalyst, i.e. $(Sr_{0.97}Y_{0.10})(Ti_{0.92}Ni_{0.08})O_3$, was made and tested according to the same steps in Example 1 and Example 2 respectively. The SYTN catalyst was subjected to ATR test using various hydrocarbon fuels, as summarized in Table 3. The commercial kerosene fuel was obtained directly from Alfa Aesar (product No. L14479).

Elemental analysis revealed that the kerosene fuel comprises hydrocarbons from C9-C13. It can be seen that, the addition of polyaromatic compound (i.e. tetralin) up to 30 mol % had negligible influence on the reforming efficiency and product selectivity, whereas the organic sulfur compound may still impose great challenge to the ATR process. Polyaromatic component in the diesel fuel is chemically much more stable than aliphatic components, and is generally believed to be the main cause for the coking problem. It has been reported that metal catalyst supported on oxygen-ion conducting substrates such as doped zirconia or ceria presented much better reforming performance in term of coking resistance, owing to the beneficial interaction between the intrinsic oxygen ion vacancies and the absorbed carbon species. The immunity of SYTN-D catalyst from catalyst deactivation when exposed in large amount of polyaromatic compound may also result from the good oxygen-ion conductivity of the strontium tinanate perovskite. It is clear that the SYTN catalyst is equally effective in breaking up H—C and C—C bonds of the carbonaceous substance dropping to the catalytic surface.

The addition of organic sulfur compound caused the conversion to drop from ~99% to 95-96% when 20 to 50 ppm MBTP was added into the hydrocarbon feedstock. The mechanism for the performance drop is still unclear. It is generally believed that sulfur tends to react with the catalyst and form stable sulfide materials and occupy the catalytically active sites on the surface, resulting in catalyst deactivation. However, unlike the dramatic deactivation that is usually observed on metal catalysts, the degradation on SYTN-D catalyst is mild and the catalytic performance was sustained over the consequent prolonged test period. This implies that the full ceramic catalyst in the present invention may have much lower affinity to sulfur as compared to the traditional metal catalysts. Nevertheless, it is worthwhile to notice a steady increase in the methane selectivity with the addition of organic sulfur compound, i.e. 0.4 to 0.7 mol % $CH_4$ for sulfur-free fuels and 3.3 mol % $CH_4$ for the fuels with 20 to 50 ppm MBTP. It was reported that the methanation reaction is generally more sensitive to sulfur poisoning than reforming reactions. Therefore, the increasing $CH_4$ amount may be indicative of certain level of catalyst deactivation by sulfur poisoning.

TABLE 3

Reforming Performance of SYTN Catalyst in Various Hydrocarbon Feeds under ATR Condition

| Catalyst Fuel | SYTN-D | | | | |
|---|---|---|---|---|---|
| | Dodecane | 70 mol % Dodecane, ~30 mol % Tetralin | 70 mol % Dodecane, ~30 mol % Tetralin, 20 ppm MBTP | 70 mol % Dodecane, ~30 mol % Tetralin, 50 ppm MBTP | Commercial Kerosene Fuel |
| Conversion (%) | 98.8 | 99.2 | 95.4 | 96.5 | 98.9 |
| Product selectivity | | | | | |
| $H_2$ (mol %) | 66.6 | 66.5 | 61.4 | 61.8 | 63.5 |
| $CO_2$ (mol %) | 20.5 | 20.5 | 23.5 | 23.6 | 21.9 |
| CO (mol %) | 12.2 | 12.6 | 11.1 | 11.3 | 12.0 |
| $CH_4$ (mol %) | 0.7 | 0.4 | 3.3 | 3.3 | 2.6 |

Example 6: Catalyst Performance Evaluation with Commercial Kerosene Fuel

Figure 7:
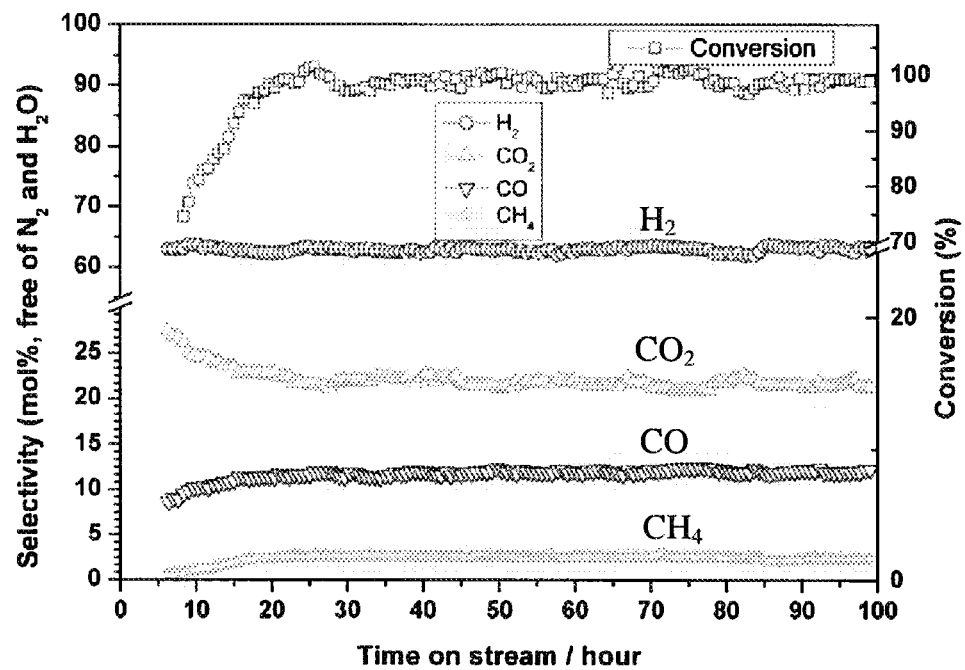
FIG. 7 depicts the time-dependent performance profiles of SYTN-D catalyst in the ATR of Low-odor Kerosene fuel (Alfa Aesar, product No. L14479) at the reaction conditions of O$_2$/C=0.35, H$_2$O/C=3, GHSV=5,000 hr$^{-1}$ and 750° C.

FIG. 7 presents the conversion and product selectivity during reforming of the commercial kerosene fuel over a SYTN-D catalyst at 750° C. and 5000 $hr^{-1}$ GHSV for 100 hours. Being different from the test in surrogate diesel feed, an obvious activation process was observed when commercial kerosene fuel was used. At the early stage of the test, the SYTN catalyst showed really poor activity towards kerosene reforming, i.e. 60 to 70% conversion during the first 10 hours of test. The high $CO_2$ content at this stage (i.e. 25 to 30%) suggests that partial oxidation and probably certain level of thermal cracking may be predominant reactions. The catalyst seemed to be activated gradually with increasing time-on-stream and achieved nearly 100% conversion after 24 hours of test. The high conversion thereafter, was sustained till the end of test. Accordingly, the $CO_2$ content monochromatically decreased and stabilized at ~22% after 24 hours of test. The reason is still unclear for the catalyst activation process when exposed to kerosene fuel. However, it may be probably related to the complex composition in the commercial kerosene fuel. It is postulated that, thermal cracking of certain aromatics and/or aliphatic hydrocarbon may take place immediately after the kerosene fuel was pumped into the reactor, leading to deposition of carbonaceous substance onto the catalyst bed and hence severe catalyst deactivation at the early stage of the test. Partial oxidation may then become the dominant process for the subsequent kerosene reforming. Owing to the excellent oxygen-ion conductivity in the SYTN catalyst, the oxygen species may continuously react with the surface deposited carbonaceous substance, and the surface active reaction sites may be recovered gradually. This is partially supported by the observation that no carbon formation was found on the catalyst surface after 100 hours test. At the end of the kerosene reforming test, the SYTN catalyst achieved ~99% conversion and a dry gas product composition of 63.5% $H_2$, 21.9% $CO_2$, 12.0% CO and 2.6% $CH_4$, indicating the possibility of using SYTN catalysts for commercial hydrocarbon fuel reforming.

In summary, the present SYTN catalyst system has demonstrated excellent catalytic activity for diesel ATR (>95% conversion with high hydrogen yield (>60%) in the diesel/kerosene reforming), much lower affinity with sulfur, and hence substantially mitigates the catalyst deactivation related to sulfur-poisoning. Additionally, this catalyst system provides a much better thermal stability at elevated temperatures (stable operation for more than 100 hours with no appreciable performance degradation). No catalyst sintering was expected even for prolonged operations.

Further advantages of the present catalyst system include:

Material costs: Only earth-abundant elements such as Y, Sr, Ti and Ni are used, thereby affording fairly low material costs.

Optimisation: By manipulating the A/B stoichiometry in the perovskite structure, the catalytic activity on diesel ATR can be controlled. For example, an A-site excess composition was found to possess the most efficient catalytic activity.

Simplicity and ease of industrial adoption: The ceramics particles can be prepared via simple sol-gel or co-precipitation method, which has been adopted for mass production in ceramics industry. In contrast to conventional two-phase catalyst systems containing noble/transition metal and a ceramics support, the preparation and processing of the catalyst system has been substantially simplified.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for stoichiometric ratio, temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

What is claimed is:

1. A method for preparing a perovskite-type strontium titanate, comprising:
    providing a solution comprising strontium nitrate, yttrium nitrate hexahydrate, and nickel (II) nitrate hexahydrate;
    adding titanium bis(ammonium lactate) dihydroxide and at least two complexing agents to the solution;
    heating the solution to form precursors of the perovskite-type strontium titanate; and
    calcining the precursors to obtain the perovskite-type strontium titanate.

2. The method of claim 1, wherein the at least two complexing agents are selected from the group consisting of citric acid, ethylene glycol, and ethylenediaminetetraacetic acid (EDTA).

3. The method of claim 1, wherein heating comprises heating the solution to a temperature of between about 80° C. and about 100° C. to form the precursors of the perovskite-type strontium titanate in a gel form.

4. The method of claim 1, wherein calcining comprises calcining the perovskite-type strontium titanate precursors to a temperature of between about 700° C. and about 1,000° C. in air.

5. The method of claim 1, wherein the perovskite-type strontium titanate is a perovskite-type strontium titanate, wherein the strontium titanate is Y- and Ni-doped and has the general formula $(Sr,Y)(Ti,Ni)O_3$.

* * * * *